(12) United States Patent
Breda et al.

(10) Patent No.: US 8,261,038 B2
(45) Date of Patent: Sep. 4, 2012

(54) METHOD AND SYSTEM FOR ALLOCATING STORAGE SPACE

(75) Inventors: Marcus Vinicius Duarte Breda, Porto Alegre (BR); Diogo Cesa Rosa, Rio Grande Do Sul (BR); Timothy L. Virgo, Colorado Springs, CO (US); Richelle L. Ahlvers-Dolphin, Colorado Springs, CO (US); Diego Paprocki Abrianos, Rio Grande Do Sul (BR); Marcelo Gomes De Oliveira, Rio Grande Do Sul (BR); Rodrigo Menezes Do Prado, Rio Grande Do Sul (BR); Alvaro De Vit Lunardi, Rio Grande Do Sul (BR); Lucas Holz Boffo, Rio Grande Do Sul (BR)

(73) Assignee: Hewlett-Packard Development Company, L.P., Houston, TX (US)

(*) Notice: Subject to any disclaimer, the term of this patent is extended or adjusted under 35 U.S.C. 154(b) by 364 days.

(21) Appl. No.: 12/765,367

(22) Filed: Apr. 22, 2010

(65) Prior Publication Data

US 2011/0264856 A1  Oct. 27, 2011

(51) Int. Cl.
*G06F 12/00* (2006.01)
(52) U.S. Cl. . 711/170; 711/112; 711/114; 711/E12.001; 711/E12.002
(58) Field of Classification Search .................. 711/112, 711/114, 170, E12.001, E12.002
See application file for complete search history.

(56) References Cited

U.S. PATENT DOCUMENTS

| | | | |
|---|---|---|---|
| 7,219,189 B1 | 5/2007 | Ryu | |
| 7,464,163 B1 | 12/2008 | Bantz | |
| 8,156,281 B1 * | 4/2012 | Grosner et al. | 711/114 |
| 2005/0240727 A1 | 10/2005 | Shah | |
| 2007/0079097 A1 | 4/2007 | Karnowski | |
| 2009/0063767 A1 | 3/2009 | Graves | |

OTHER PUBLICATIONS

Edison Group TCO White Paper, "EMC, NetApp, and HP Midrange Storage Arrays," Nov. 2007, Edison Group, 89 Fifth Avenue, 7th Floor, New York City, New York 10003.
Hewlett-Packard Development Company, L.P., "HP Virtual Resource Pools: Key Enabler of Converged Infrastructure Architecture," 2009.
Hewlett-Packard Development Company, L.P., "HP StorageWorks SAN Virtualization Services Platform-Overview & Features," 2009, available at http://h18000.www1.hp.com/products/storage/software/sanvr/index.html (last accessed on Dec. 4, 2009).
Hewlett-Packard Development Company, L.P., "HP Installation and Startup Service for HP StorageWorks SAN Virtualization Services Platform (SVSP)," Mar. 2009.
Hewlett-Packard Development Company, L.P., "HP StorageWorks SAN Virtualization Services Platform 2.1.1 release notes," Part No. 5697-0066, Fifth edition: Jul. 2009, pp. 1-22.

(Continued)

*Primary Examiner* — Kevin Ellis
*Assistant Examiner* — Mehdi Namazi

(57) ABSTRACT

A method is provided method for allocating storage space. The method includes obtaining performance parameters for a storage pool, wherein the performance parameters comprise a size of the storage pool and a type of the storage pool. Proposed back end logical units (BELUs) to match the performance parameters are determined. Current disk groups for the proposed BELUs are identified, and if none exists, a plurality of storage arrays is analyzed to locate free disks that can be formed into a proposed disk group to support the creation of the proposed BELUs. A proposal is created showing the changes that would be made to a storage system to create the storage pool.

20 Claims, 6 Drawing Sheets

OTHER PUBLICATIONS

Komiega, Kevin, "HP strikes back with Converged Infrastructure Architecture," Nov. 2009, PennWell Corporation, available at Y:\HP\HPQB 201-225\hpqb-0215\References\HP strikes back with Converged Infrastructure Architecture—Infostor.mht.

Lee, Justin, "HP Counters Cisco Alliance with Virtualized Data Center Services," Nov. 4, 2009, avaliable at http://www.thewhir.com/web-hosting-news/110409_HP_Counters_Cisco_Alliance_with_Virtualized_Data_Center_Services (last accessed on Dec. 4, 2009).

Villars, Richard L., et al., "Business Value of Storage Virtualization: Scaling the Storage Solution; Leveraging the Storage Investment," Published by IDC, 5 Speech Street, Framingham, MA 01701, 2009, pp. 1-13.

Hewlett-Packard Development Company, L.P., "HP StorageWorks SAN Virtualization Services Platform Manager user guide," Part No. 5697-0295, Third edition: Jan. 2010, pp. 1-398.

Hewlett-Packard Development Company, L.P., "HP StorageWorks SAN Virtualization Services Platform administrator guide," Part No. 5697-0204, Third edition: Jan. 2010, pp. 1-170.

Hewlett-Packard Development Company, L.P., "HP StorageWorks SAN Virtualization Services Platform 3.0 release notes," Part No. 5697-0212, Sixth edition: Jan. 2010, pp. 1-24.

* cited by examiner

METHOD AND SYSTEM FOR ALLOCATING STORAGE SPACE

BACKGROUND

A business network may include large numbers of storage resources, such as multiple disk arrays, network-attached storage (NAS) devices, and the like. As a result, a large data center may have tens, hundreds, or even thousands of disk drives. In many data centers, the physical disk drives are assigned to groups of drives that are further grouped into pools of storage. Virtual disk drives may then be assigned to the pools of storage. The virtual drives act as physical drives to host computers, which generally not have to have an actual map of the physical configuration of the storage arrays.

However, managing the storage resources has become a critical activity. To configure and to define the correct configuration is a complex activity that is made more difficult by the different storage characteristics of the storage resources, such as redundancy level, availability time and performance. When combined with the access speed and performance needed by the host computers, the problem becomes even more difficult. Up to 80% of the total cost of ownership (TCO) of a storage array may be spent on configuration and management activities.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Virtualization of storage capacity in enterprise storage systems can increase utilization of the enterprise storage systems and decrease management cost associated with the enterprise storage systems. This may be performed by placing virtual layers between physical storage and the actual consumers of the data. Such layers may include groups of disk drives. Virtual disks (called back end logical units or BELUs) may be created within the groups of disk drives. The BELUs may then be further grouped into storage pools that are indirectly accessed by data consumers. Exemplary embodiments of the present invention provide automated tools for the configuration of storage pools (for example by automatically locating unallocated disk space for the creation of disks groups and BELUs) within arrays of disk drives in an enterprise storage system. The automated tools can substantially lower the configuration time used to set up storage pools, decrease the possibility that poorly configured storage pools will cause poor functioning of storage systems, and increase the overall performance of network storage.

Figure 1:
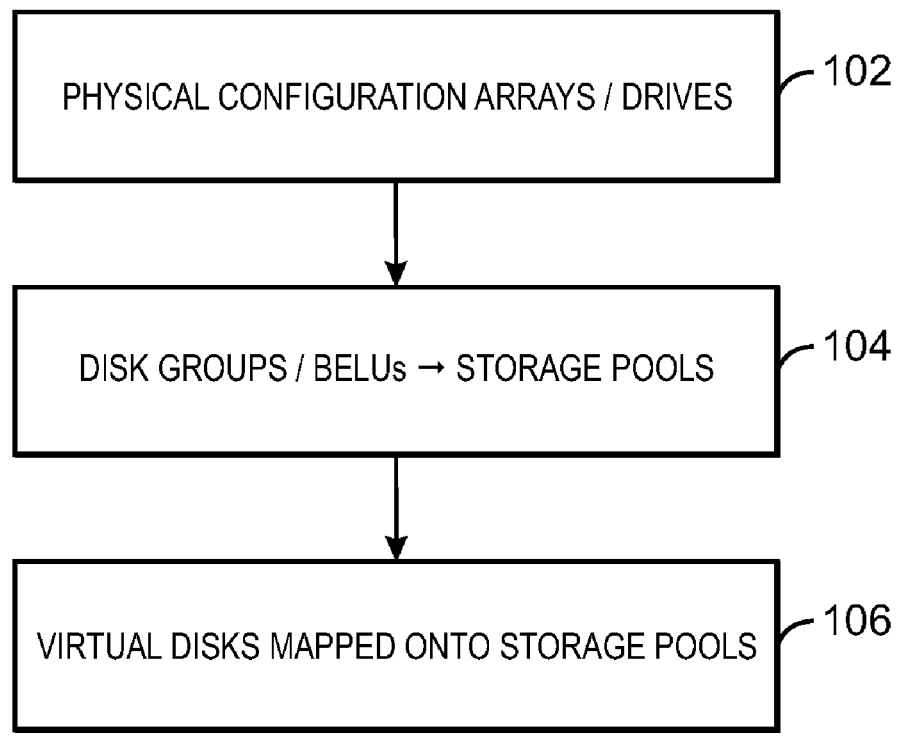
FIG. 1 is a block diagram presenting a conceptual overview of an enterprise storage system, in accordance with exemplary embodiments of the present techniques.

FIG. 1 is a block diagram presenting a conceptual overview of an enterprise storage system 100, in accordance with exemplary embodiments of the present techniques. The enterprise storage system 100 has a physical configuration 102 that may include numerous storage arrays, each of which may have numerous disk drives of multiple types. For example, the storage arrays may include units such as the StorageWorks Enterprise Virtual Array (EVA), available from the Hewlett Packard Corporation. The techniques described herein are not limited to the EVA, as they may be used with HP Storage-Works XP disk arrays, HP StorageWorks Modular Smart Arrays (MSA), and arrays available from other manufacturers.

The disk drives within the storage arrays may fall into two categories, near on-line disks and on-line disks. Near on-line (NOL) disks may be larger capacity, slower disks that may be used for bulk storage of files that do not need fast access and processing, such as archived databases, off-line records, old emails and the like. The NOL disks can be coupled to the storage array by serial ATA (SATA), Fibre Channel ATA (FATA), and other low cost technologies. The size of the NOL disks may be, for example, 500 GB, 1 TB, 2 TB, or larger. The spin rate (in RPM) of the NOL disks (which corresponds to data transfer rates and access time) may be about 3.5K/sec, 7K/sec, or higher. However, NOL disks are not limited to these sizes or rates.

The on-line (OL) disks may often be smaller, faster drives that are used for storage of data that is being currently processed or accessed by hosts, for example, Web site pages used for ordering materials, current e-mails, active databases and the like. OL disks may be coupled to a storage array by Fibre Channel (FC) or other high speed bus technologies. The size of the OL disks may be 150 GB, 250 GB, 500 GB, or larger. The RPM of OL disks may be 10 K/sec, 15 K/sec, or higher. However, OL disks are not limited to these sizes or rates.

As indicated by block 104, the disk drives of the array may be grouped into disk groups. Disk space from the disk groups can be organized into a first set of virtual disks. A virtual disk is a set of disk blocks from one or more disk drives that can be presented to a system as if it is a single disk storage device. Each virtual disk may be assigned a logical unit number (LUN) that is not visible to any host computers that utilize the storage. Within the enterprise storage system, the LUNs for the first set of virtual disks may be termed "Back-end LUNs." Thus, the virtual disks may be termed back end logical units or BELUs. The BELUs may be grouped together to form storage pools. Storage pools may be created to maximize storage (capacity pools) or to maximize performance (performance pools).

The type of storage pool can influence the BELUs and disk groups used for the storage pool. For example, a capacity pool may be created from BELUs within NOL disk groups when the access times may not be as important. Similarly, a performance pool may be formed from BELUs within OL disk groups, when access times may be important, for example, for currently active data. A second set of virtual drives can be mapped into the storage pools. Each of the second set of virtual drives can be assigned another LUN, called a front end LUN, to allow a host to access the virtual drives.

Current storage virtualization services require that storage administrators manually configure disk groups, BELUs and storage pools on the storage arrays for virtualization. Each of the units created are then manually presented to a storage management client (such as HP StorageWorks SAN Virtual Services Platform, or SVSP, among others) through the device manager responsible for managing each one of the arrays. The manual configuration of disk groups, BELUs, and storage pools, can be very time consuming, because storage virtualization environments are often quite large. Further, device managers are usually configured such that the creation of each unit, such as the disk group or BELU, is made individually, one operation at a time. Thus, the provision of disk groups and BELUs for storage virtualization may take from several hours to several days.

To create the storage pools, the storage administrator is asked to go to each array device manager, identify a current disk group or create a disk group for the BELUs. The storage administrator then creates the BELUs at a properly configured RAID level, and presents them to the storage management client for grouping into the storage pools. The storage administrator needs to carefully distribute the capacity across all of the array controllers while creating the new BELUs to avoid overloading any single array. This can be a complex process, with many opportunities for errors. For example, during the manual configuration process, the storage administrator may choose a wrong RAID level or allocate a BELU to an already overloaded array.

Accordingly, an exemplary embodiment of the present techniques provides an automated tool for creating the disk groups and BELUs for the storage pools. The tool may be termed a BELU provisioning service, as it may simplify the creation of the BELUs for storage pools. In an exemplary embodiment, the BELU provisioning service is a web service application that has the capability to automatically create BELUs within disk groups that may be aggregated to form specific types of storage pools. By receiving as input the desired size and type of the storage pool, the BELU provisioning service can calculate the best BELU distribution among the arrays, create the BELUs in the disk groups, and present the BELUs to the storage management client so that the storage pool can be created. The BELU distribution is calculated by BELU provisioning internal algorithms, for example, based on well-defined storage array best practices guidelines.

After a basic configuration step, where the storage administrator selects the storage arrays to use for automatic creation of pools, the next step is to select the type of storage pool, i.e., capacity or performance. To create a capacity pool, the storage administrator only needs to enter the pool name and the desired size. To create a performance pool, the storage administrator can also provide a number of stripes that may correspond to the number of BELUs to be created. Once the storage administrator provides those inputs, the BELU provisioning service will search through the disk groups among the storage arrays and calculate the best distribution of BELUs among them, according to the pool type.

The result will be presented to the storage administrator as a proposal, listing all the configuration steps that will be performed by the BELU provisioning service. For example, the BELU provisioning service may identify that no disk groups currently exist that have appropriate parameters for the BELUs that would be aggregated to create the requested storage pools. In this case, the BELU provisioning service may create a proposal that identifies unallocated disks that can be grouped, and identifies the BELUs that would be assigned to the disk group if created. The storage administrator can then analyze the proposal and choose to execute it or not. This provides the storage administrator with control and flexibility, since it is possible to verify everything that will be changed in the environment and then select whether the storage administrator wants those tasks to be performed. In some embodiments, the storage administrator may customize the proposal, for example, by choosing to create the disk groups, and assigned BELUs, in a different storage array than proposed by the BELU provisioning service.

Once the BELUs are created, as indicated at block 106, they can be aggregated into the storage pools, and one or more virtual disks may be mapped onto each the storage pools. A front end LUN can then be presented to the host for access to each of the virtual disks. Although a BELU may match the size of the disk group, multiple smaller BELUs may be assigned within a larger disk groups, for example, if two BELUs were assigned to a single capacity pool. Further, as noted above, storage pools may be made from multiple, aggregated BELUs, for example, in performance pools each stripe can be assigned to one BELU. The overview above may be seen more clearly in the example configuration shown in FIG. 2.

Figure 2:
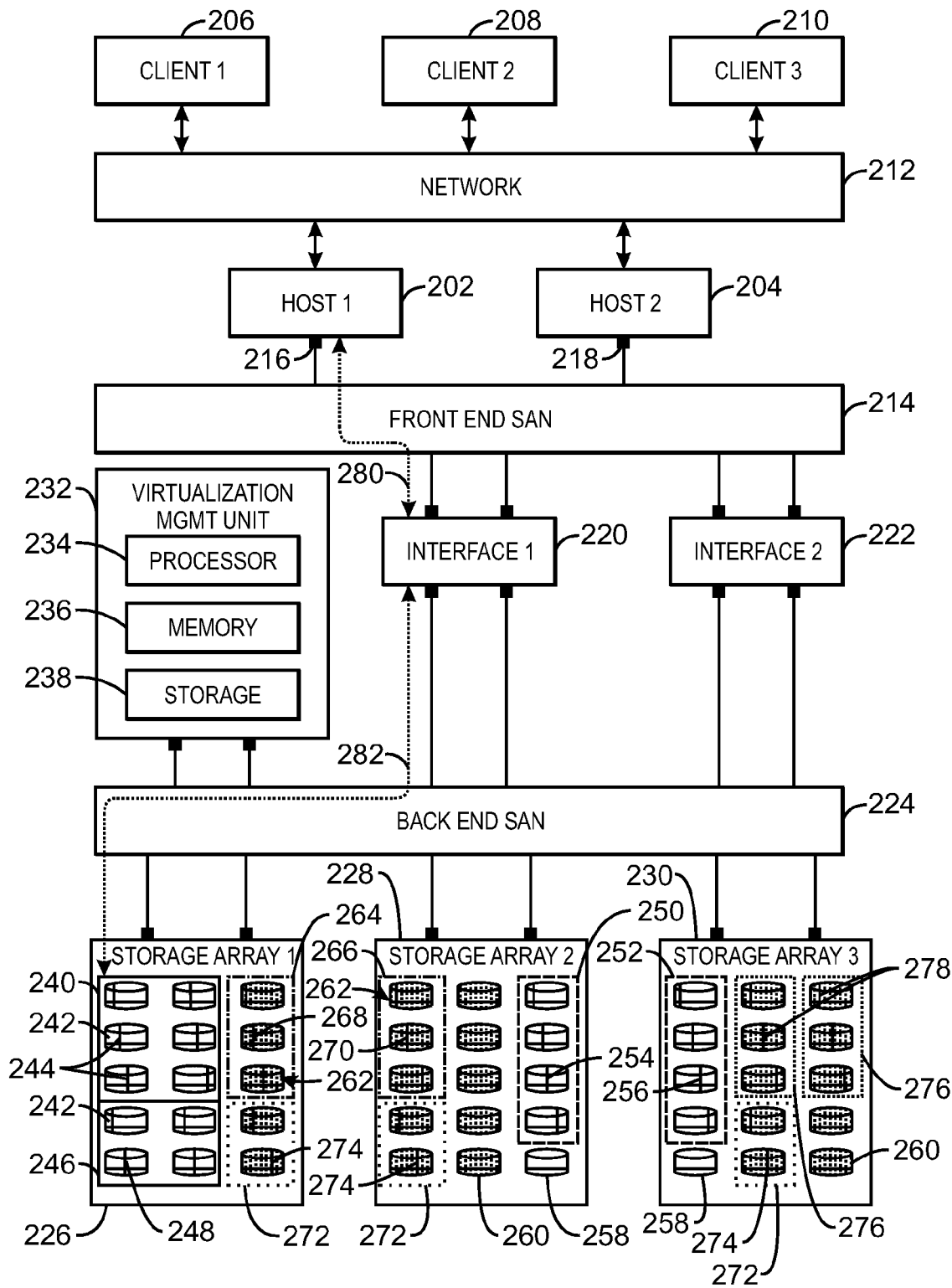
FIG. 2 is a block diagram of a enterprise storage system, in accordance with an exemplary embodiment of the present techniques.

FIG. 2 is a block diagram of an enterprise storage system 200, in accordance with an exemplary embodiment of the present techniques. However, the techniques are not limited to this configuration for the enterprise storage system 200, as any number of configurations can be used. For example, a large enterprise storage system 200 may often have many more hosts and storage arrays than shown in this illustration. The enterprise storage system 200 may be accessed from one or more host computers, such as host 1 202 and host 2 204. The host computers 202 and 204 may provide data, such as Web pages, database screens, and other services, to one or more client computers, such as client 1 206, client 2 208, and client 3 210, for example, over a network 212. The network 212 may be a local area network (LAN), wide area network (WAN), a storage area network (SAN), or other network, such as the Internet. The host computers 202 and 204 may be coupled to a front end SAN 214, for example, by one or more Fibre Channel (FC) ports, such as FC ports 216 and 218 (indicated as blocks).

One or more storage system interfaces, such as interface 1 220 and interface 2 222 may be coupled through FC ports to the front end SAN 214 to facilitate communications between the host computers 202 and 204 and one or more locations coupled to a back end SAN 224, for example, storage array 1 226, storage array 2 228, and storage array 3 230. The front end SAN 212 and the back end SAN 214 do not have to be separate, as they may be combined into a single SAN to which all units are connected. In this case, each interface 220 and 222 may only have a single set of FC connections.

In an exemplary embodiment, the interfaces 220 and 222 are Data Path Modules (DPMs) available from HP. However, the interfaces 220 and 222 are not limited to the use of DPMs, as other technologies from other manufacturers could benefit from the techniques described herein. The back end SAN 224 provides the interconnections between the basic units of the enterprise storage system 200. For example, in addition to the storage arrays, 226, 228, and 230, the back end SAN may be coupled to a virtualization management unit (VMU) 232. In an exemplary embodiment, the VMU 232 is a Virtualization Services Manager (VSM) unit available from HP. However, the VMU 232 is not limited to the use of the VSM, as other technologies from other manufacturers could benefit from the techniques described herein.

The VMU 232 may have a processor 234, memory 236 (such as ROM and/or RAM), and a storage unit 238 (such as a hard drive, optical drive, and the like). Further, the VMU 232 may be configured to use one or more BELUs in the storage arrays 226, 228, and 230 to store operating software and data. The memory 236, storage unit 238, or BELUs within the storage arrays 226, 228, and 230, make up non-transitory, computer readable media in which the data and operating programs for the VMU 232 can reside. The VMU 232 may be a HP StorageWorks Virtualization Services Manager, but the VMU 232 is not limited to this unit, as the techniques disclosed herein may be useful for VMUs from other manufacturers.

The VMU 232 may be used to configure the storage arrays. For example, a graphical user interface may be presented to a storage administrator that allows the storage administrator to enter desired parameters for storage pools, such as size, type (e.g., performance or capacity), and, if a performance pool, the number of stripes. In exemplary embodiments, the parameters may then be used to create appropriate disk groups and/or BELUs for building storage pools, as discussed with respect to an exemplary embodiment below. It can be clearly understood that the example below has been simplified to more easily explain the present techniques. Thus, the present techniques are not limited to the disk sizes, storage arrays, disk configurations, or enterprise storage system 200 configurations shown in FIG. 2 and discussed below. Further, the examples below focus on the creation of new disk groups and BELUs. Before creating new disk groups or BELUs, the VMU 232 may examine the storage arrays for existing disk groups that may hold the BELUs needed and/or existing BELUs that can be aggregated to form the storage pool requested.

To illustrate the operation of the BELU provisioning service, it may be assumed that storage array 1 226 has a previously configured first disk group 240 formed from six 1 TB NOL FATA disks 242 (i.e., an existing disk group). In this example, the first disk group 240 has assigned to it a single existing BELU 244 (shown as stripes in the disk group 240). The BELU 244 may be assigned to a capacity pool, to which front end LUNs, or virtual disk drives, can be assigned. A previously configured second disk group 246 in storage array 1 226 groups four 1 TB NOL FATA disks 242. As for the first pool, the second pool may also have assigned to it an existing (previously created) BELU 248. For purposes of this example, it may be assumed that the current disk groups 240 and 246 were created before the implementation of the BELU provisioning service, as a more efficient configuration may group all of the 1 TB NOL FATA disks 242 in a single array into a single disk group, using a single BELU to which multiple front end Logical Unit Numbers could then be assigned.

If a storage administrator requests the formation of an 8 TB capacity pool, the VMU 232 may analyze the storage arrays 226, 228, and 230, and find that no current disk group is large enough to hold a single BELU of that capacity, for example, that eight unassigned 1 TB NOL FATA disks are not present on any single one of the storage arrays 226, 228, and 230. Therefore, the VMU 232 may create a proposal to form a proposed first four TB disk group 250 in storage array 2 228 and a proposed second four TB disk group 252 in storage array 3 230 (i.e., proposed disk groups). The proposal could then suggest the creation of a proposed first BELU 254 assigned to proposed disk group 250 and a proposed second BELU 256, assigned to the second proposed disk group 252. Further, the proposal may suggest that the two proposed BELUs 254 and 256 may be aggregated to form the 8 TB capacity pool. If the proposal is accepted, the VMU 232 may create the two disk groups 250 and 252 (forming actual disk groups), assign the BELUs 254 and 256 (forming actual BELUs), and aggregate the BELUs to form the eight TB capacity pool 248.

Further, if the storage administrator requests a 10 TB capacity pool, the VMU 232 analysis may determine that there is not a sufficient number of unallocated disks to build a new disk group for the 10 TB storage pool within the storage arrays 226, 228, and 230. However, the VMU 232 may identify that the disk groups 250 and 252 holding the two four TB BELUs 254 and 256 may be grown by adding unallocated 1 TB NOL FATA disks 258 from storage arrays 228 and 230 to each of the disk groups 250 and 252. The suggestion to incorporate the unallocated disks 258 into each of the disk groups 250 and 252, i.e., to form two expanded, five TB disk groups 250 and 252, may then be incorporated into a proposal for the storage administrator. Further, the proposal can incorporate a suggestion to assign two more BELUs, of five TB each, to the expanded disk groups 250 and 252.

Although the discussion above focuses on creating new disk groups, current disk groups may be migrated to improve the efficiency of the storage system. For example, instead of creating two new disk groups 250 and 252 for the eight TB capacity pool, the VMU 232 may propose migrating the smaller disk group 246 from storage array 1 226 to the unallocated disks in storage array 2 228, thus freeing the four disks 242 that were previously assigned to disk group 246. The proposal could then suggest that the first disk group 240 could be grown within storage array 1 226. This would reduce the need for the creation of two the new BELUs 254 and 256 for the eight TB capacity pool capacity pool.

Although the storage administrator may set the RAID level as a separate parameter, in embodiments, the RAID level (e.g., RAID 5) may be globally set for the system. Further, capacity pools are not limited to NOL disks, and may be created from OL disks. However, the VMU 232 will generally target NOL disks for capacity pools, to provide a greater storage size at a lower cost.

Performance pools may be created from groups of OL FC disks 260, although performance pools are not limited to OL FC disks 260, and could be created using groups of NOL disks. In addition to size, the parameters for forming performance pools may include a striping parameter to indicate the number of stripes, or separate simultaneous data accesses, that the pool uses. Each stripe is generally assigned to an individual BELU in a separate disk group. Higher numbers of stripes can correspond to increased performance of the pool. In an exemplary embodiment, each storage array 226, 228, and 230, may have a number of separate array controllers and, thus, would be capable of as many separate simultaneous read and/or write operations to BELUs assigned to disk groups in that storage array as the number of array controllers for the storage array. In the example discussed with respect to FIG. 2, each storage array 226, 228, and 230 may have two array controllers, although other storage arrays may have four array controllers, sixteen array controllers, or more.

Simultaneous reading or writing to the disks of a single storage array may not be as fast as writing to two separate storage arrays. Therefore, the VMU 232 analysis first looks for sufficient available space on as many separate arrays as the number of stripes chosen. Each stripe will be created as a separate BELU in the arrays.

In the example illustrated in FIG. 2, the OL FC disks 252 may be assumed to be 250 GB in capacity. If a storage administrator requests the formation of a performance pool having a 1.5 TB capacity and two stripes, the VMU 232 can identify that storage array 1 226 and storage array 2 228 each have three OL FC disks 262 available, for a total of six. Therefore, the VMU 232 may propose the formation of a first 750 GB disk group 264 on storage array 1 226 and a second 750 GB disk group 266 on storage array 2 228. The proposal may also propose forming a first BELU 268 in the first disk group 264 and a second BELU 270 in the second disk group 266. Further, the proposal may also suggest aggregating the first BELU 268 and the second BELU 270 to form the performance pool.

Similarly, if a storage administrator requests the formation of a performance pool having a 1.5 TB capacity and a three stripe configuration, the VMU 232 may identify two 250 GB OL FC disks in each one of the three storage arrays 226, 228, and 230. The VMU 232 may then propose the formation of three disk groups 272, one in each of the storage arrays 226, 228, and 230. The proposal would also suggest the formation of three BELUs 274, one in each of the disk groups 272, and propose aggregating the three BELUs 274 to form the performance pool.

In a final example, it may be assumed that the proposals for the formation of the storage pools above were accepted and/or preallocated. If the storage administrator then requested the formation of a performance pool having a 1.5 TB capacity and two stripes, the VMU 232 may suggest assigning two new BELUs to each of the disk groups 264 and 266 of the first performance pool and aggregating the new BELUs to form the performance pool.

However, the storage administrator may refuse the proposal, for example, if a host 202 or 204 accessing a virtual disk in the first performance pool may need a large portion of the assigned capacity. Accordingly, the storage administrator could direct the VMU 232 to analyze the storage arrays 226, 228, and 230 to propose the formation of disk groups for another performance pool. The VMU 232 analysis may identify that only storage array 3 230 has sufficient numbers of unassigned OL FC disks 260. Thus, the VMU 232 may propose the formation of two disk groups 276 within storage array 3 230. The proposal may also recommend the formation of two BELUs 278, wherein one is assigned to each of the disk groups 276. The BELUs 278 can be aggregated to form the performance pool. Each of the individual BELUs 278 of the performance pool 260 may be assigned to individual controllers in the storage array 3 230, providing higher performance.

Once the storage pools are created, virtual disks can be mapped to the storage pools. The virtual disks can be mapped to front end LUNS, which are presented to the hosts 202 and 204 for accessing the associated storage. The mapping may be performed by the VMU 232 and transferred to the interfaces 220 and 222. For example, host 1 202 may be assigned a front end LUN that represents a virtual disk assigned to a capacity pool formed from BELU 244 within the first disk group 240 of storage array 1 226. Accordingly, once host 1 202 has mounted the virtual drive represented by the front end LUN, a data request 280 may be sent out from host 1 202 to access data on the virtual disk using the front end LUN. The data request 280 is intercepted by interface 1 220, which uses a map of front end LUNs to BELUs to send a corresponding request 282 to storage array 1 226. Storage array 1 226 may then access the data in BELU 244 and return the data to host 1 202 via interface 1 220.

Figure 3:
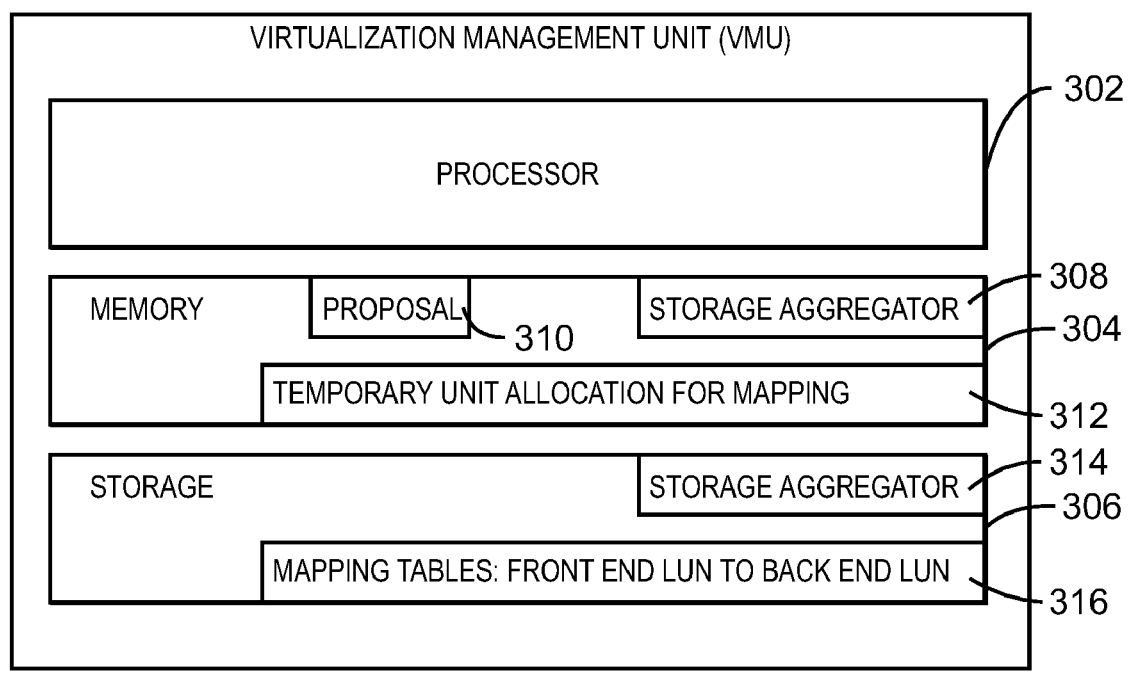
FIG. 3 is a block diagram of the VMU, in accordance with an exemplary embodiment of the present techniques.

FIG. 3 is a block diagram of the VMU 232, in accordance with an exemplary embodiment of the present techniques. The VMU 232 may have a processor that may be configured to implement embodiments of the present techniques. As mentioned previously, the processor 302 may be coupled to a non-transitory, computer readable media, such as a memory 304 and/or a storage unit 306. The memory 302 may include random access memory (RAM), read only memory (ROM), or a combination thereof. Further, the processor 302 and memory 304 may be combined in a single device, such as an application specific integrated circuit (ASIC). The memory 304 may contain code to provide the functionality of the BELU provisioning service, such as a storage aggregator 308. The storage aggregator 308 may implement a method for creating disk groups and BELUs for storage pools, for example, as discussed with respect to FIG. 4, below. Accordingly, the storage aggregator 308 may generate a proposal 310 for creating the disk groups and BELUs that support the storage pools requested. The proposal 310 is linked to a temporary unit allocation 312 for mapping the proposed BELUs to the storage arrays 226, 228, and 230.

The VMU 232 may also be associated with other non-transitory computer readable media, such as a storage unit 306. The storage unit 306 may provide long term storage, for example, for the storage aggregator 314, as well as for other code used for the virtualization operations. The storage unit 306 may also be used to hold mapping tables 316 that map the virtual disks (i.e., the front end LUNs) to the BELUs of the storage pools. If the proposal 310 is accepted, the temporary unit allocation for mapping 312 can be incorporated into revised mapping tables 316 and the revised mapping tables 316 may be sent to the interfaces, for example, interface 1 220 or interface 2 222 (FIG. 2). The storage unit 306 may be hard drive located in the VMU 232, but is not limited to a storage unit contained within the VMU 232. In an exemplary embodiment, the storage unit 306 includes one or more BELUs located in the disk groups of the storage arrays.

Figure 4:
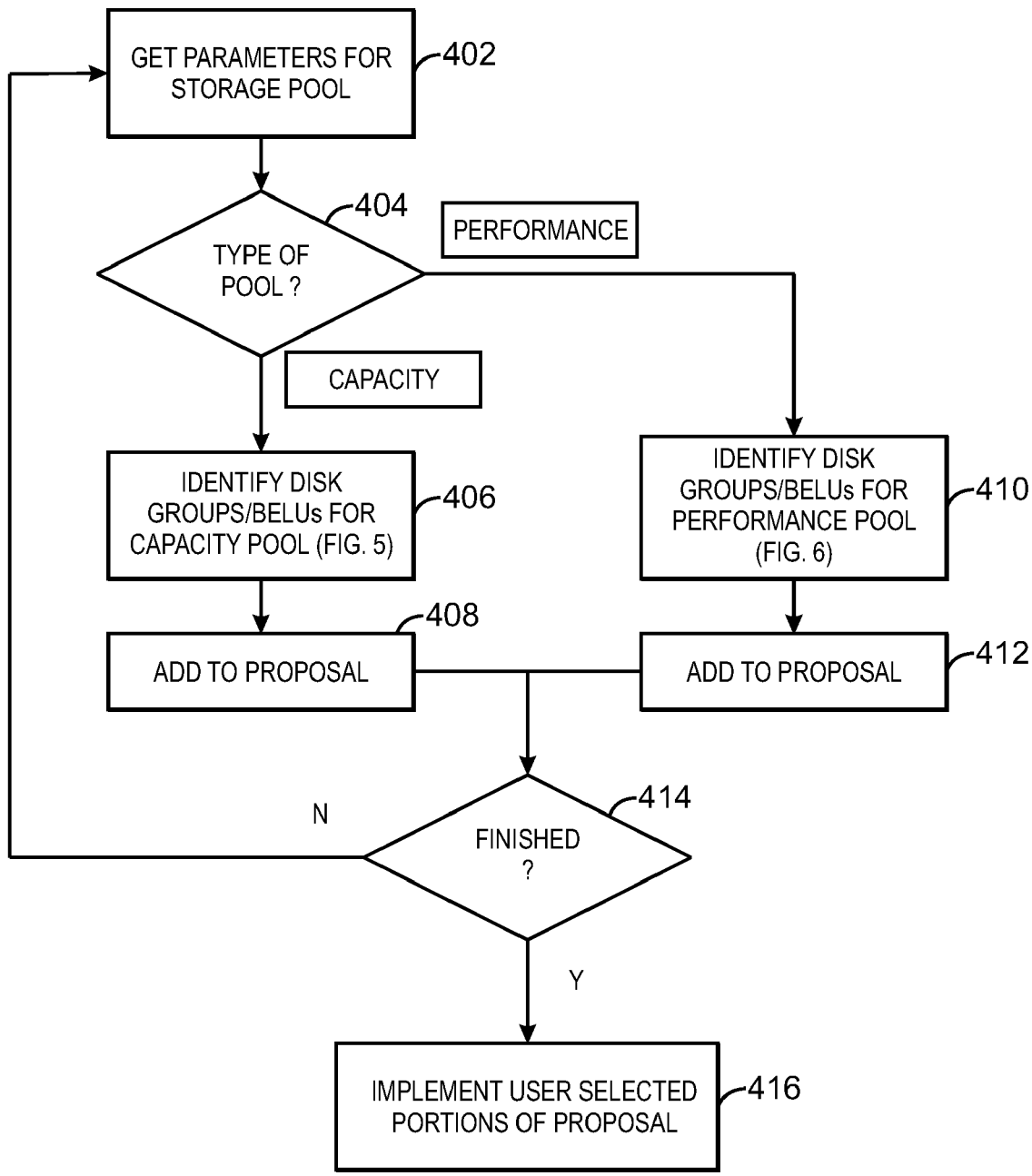
FIG. 4 is a process flow diagram of the method used by the storage aggregator for creating storage pools for BELUs, in accordance with an exemplary embodiment of the present techniques.

FIG. 4 is a process flow diagram of a method 400 used by the BELU provisioning service for creating disk groups and BELUs for a storage pool, in accordance with an exemplary embodiment of the present techniques. The method 400 begins at block 402 with the storage aggregator obtaining the desired parameters for the storage pool from a storage administrator. As noted above, these parameters may include the type of pool desired, the size of the pool, and, if a performance pool, the number of stripes in the pool. Other parameters may also be included, such as disk drive type, or preferred storage array, among others. At block 404, the method 400 determines what type of pool is being created. If the storage pool is a capacity pool, process flow proceeds to block 406.

At block 406 the method 400 analyzes the storage arrays to identify what storage arrays have sufficient space for the capacity pool, and whether new disk groups or BELUs need to be created. This is discussed in further detail with respect to FIG. 5. Once the analysis is completed, at block 408, any changes that may be made to create the capacity pool are added to a proposal to be presented to the storage administrator. Process flow then proceeds to block 414.

If at block 404, the method identified that the type of pool needed is a performance pool, process flow proceeds to block 410. At block 410, the method analyzes the storage arrays to identify whether any disk groups meet the needed performance parameters for the performance pool or whether a new disk group or groups need to be created. BELUs are temporally allocated to the disk groups, and tentatively allocated to the performance pool. This is discussed in further detail with respect to FIG. 6. At block 408, the information is added to a proposal to be presented to the storage administrator. Process flow then proceeds to block 414.

At block 414, the method 400 determines if the configuration process is finished. If not, flow returns to block 402 to continue with the configuration process. As each new storage pool is requested, the storage aggregator proceeds from the temporary allocation made at the end of the last configuration request. In other words, the analysis of the storage arrays for the formation of additional disk groups and/or BELUs proceeds as if the previous proposals have been accepted. Once the configuration process is finished, flow proceeds to block 416. At block 416, the proposal is presented to the storage administrator. The storage administrator may choose to implement all of the proposed changes, a portion of the proposed changes, or to modify certain proposals. For example, if the BELU provisioning service proposes that a new BELU may be assigned to a currently existing disk group, the storage administrator may select to not have the BELU assigned to that disk group, but instead to create a new disk group for the BELU.

Figure 5:
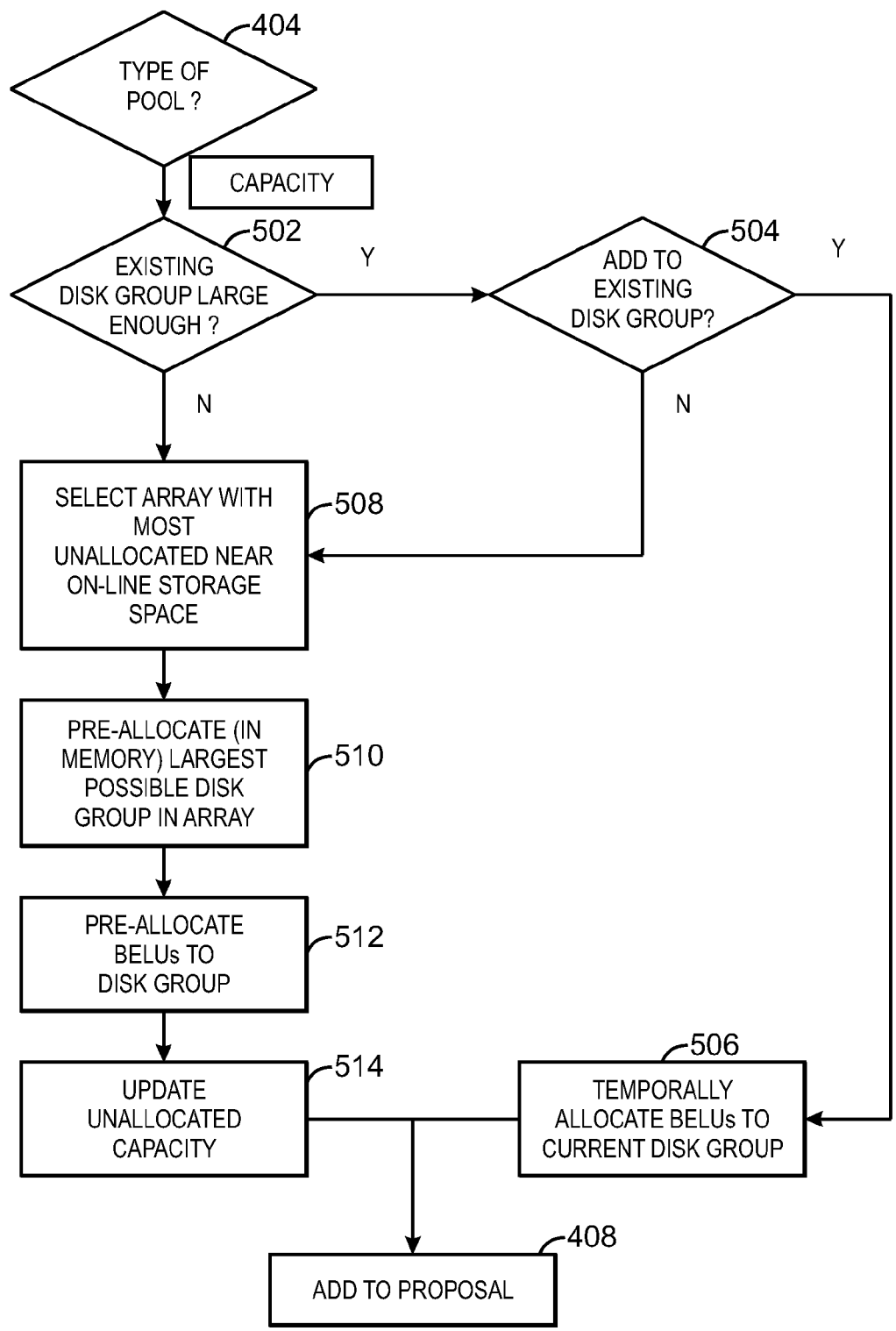
FIG. 5 is a process flow diagram showing the identification of a capacity pool within a set of storage arrays, in accordance with an exemplary embodiment of the present techniques.

FIG. 5 is a process flow diagram showing the identification of space for a capacity pool within a set of storage arrays, in accordance with an exemplary embodiment of the present techniques. If, at block 404, the method 400 identifies that a capacity pool is needed, flow proceeds to block 502. At block 502, the storage aggregator analyzes the current disk groups to determine if a currently existing disk group has sufficient size. If a currently existing disk group is large enough, flow proceeds to block 504, where a determination is made as to whether the BELU may be assigned to the current disk group. If no currently existing disk group is of sufficient size, flow proceeds to block 508.

However, if the BELU may be added to the currently existing disk group, the method then proceeds to block 506, where the BELU is temporarily allocated to the current disk group, for example, in the memory of the VMU. Process flow then proceeds to block 408 of FIG. 4, where the tentative assignments are added to the proposal. If at block 504, it is determined that the BELU cannot be allocated to the currently existing disk group, for example, if a storage administrator has marked that the new BELU should not be assigned to the current pool, flow proceeds to block 508.

A capacity pool is typically used for archival storage of data that may not need to be quickly accessible. The objective of the capacity pool is to have the lowest cost per unit storage possible. One way of achieving the objective is to have as few BELUs as possible in the disk group. Thus, at block 508, the storage aggregator identifies the storage array with the most unallocated NOL disk storage space. If sufficient storage space is on a single storage array to hold the capacity pool, then only a single BELU may be utilized. Further, the unallocated storage space may provide a proxy for determining the least utilized storage array and, thus, the array that may have the best performance for the storage pool. BELUs for capacity pools may be created using RAID 5, which provides a good trade-off between available space and redundancy level.

At block 510, the storage aggregator pre-allocates (for example, in the VMU memory) a largest possible disk group in the array, for example, at least the space needed by the capacity pool. If no storage array has sufficient space to hold the capacity pool, the storage aggregator may identify a disk group that may be expanded with unallocated NOL disks to gain sufficient space. The possibility of expanding a current disk group may then be added to the proposal for the storage administrator. Once the identification of unallocated NOL disks is completed, at block 510, the storage aggregator may preallocate the BELU (or BELUs if disk groups from more than one array is used to form the storage pool). At block 514, the storage aggregator updates the temporary unit allocation in the VMU memory to reflect the tentative creation of the disk groups and BELUs for the storage pool, and the temporary aggregation of the BELUs to form the storage pool. Process flow then proceeds to block 408 of FIG. 4, where the tentative assignments are added to the proposal. The listing of unallocated disks will be added to a permanent allocation list in the mapping table if the storage administrator accepts the proposal.

Figure 6:
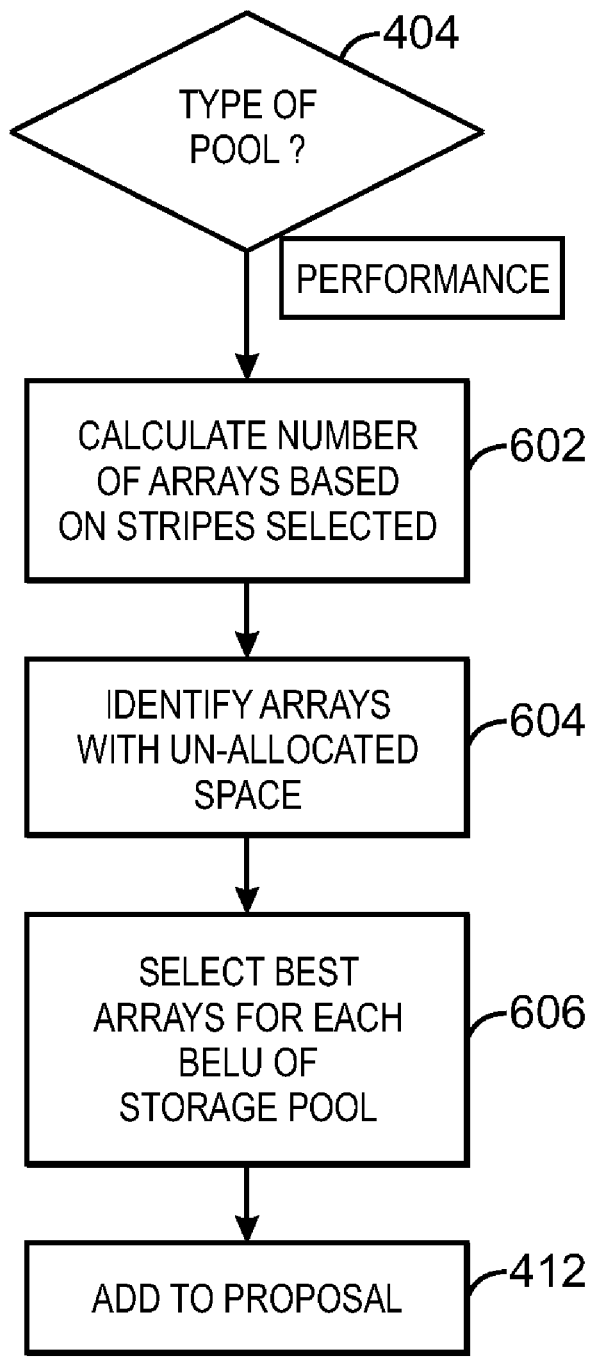
FIG. 6 is a process flow diagram showing the identification of a performance pool within a set of storage arrays, in accordance with an exemplary embodiment of the present techniques.

FIG. 6 is a process flow diagram showing the creation of disk groups and BELUs within a set of storage arrays to support a performance pool, in accordance with an exemplary embodiment of the present techniques. If, at block 404 of FIG. 4, the method 400 identifies that a performance pool is requested, flow proceeds to block 602. A performance pool is typically used for data that is subject to frequent I/O access. The objective of a performance pool is to have the best I/O throughput possible. One way to achieve this objective is to have equally sized BELUs spread across as many of the storage arrays as possible. Accordingly, at block 602, the storage aggregator calculates the number of arrays based on the number of stripes selected, wherein each stripe has a corresponding BELU. At block 604, the storage aggregator identifies the storage arrays with unallocated OL disk storage space that may be used to form disk groups (to which a BELU can be assigned) for the performance pool. If the number of stripes exceeds the number of available storage arrays, more than one BELU may be created on a single storage array, wherein each of the BELUs on a single storage array may be assigned to one of the controllers on the array. For example, 16 BELUs may be assigned in a storage array having 16 controllers, wherein each BELU is assigned to a separate controller.

At block 610, the storage aggregator selects the best storage arrays for each BELU of the performance pool. This can be performed by selecting a current OL disk group with space available for the BELU. If no disk group has space available for the BELU, the storage aggregator identifies a disk group that may be grown to accommodate the BELU. If no current disks groups can either accept the BELU or be grown to hold the BELU, a new disk group can be tentatively created. This is repeated until all BELUs for the performance pool are assigned to either a current disk group or a proposed disk group.

Once the identification of disk groups for the BELUs is completed, the storage aggregator may update the listing of unallocated disks in the VMU memory to reflect the tentative creation of the storage pool. Process flow then proceeds to block 412 of FIG. 4, where the tentative assignments are added to the proposal. The listing of unallocated disks will be added to a permanent allocation list in the mapping table if the storage administrator accepts the proposal.

EXAMPLE

The method discussed above was tested in comparison to the manual creation of BELUs and storage pools by a configuration expert. The results are shown in Table 1. As shown by the results in Table 1, the BELU provisioning service has a performance that is 80.7% better for performance pools and 53% better for capacity pools than previous versions (which use a manual configuration system).

TABLE 1

Back-End LUN Provisioning Performance

| Task: Create a 2.2 TB pool using 5 EVAs | SVSP 2.X (No Back-end LUN Provisioning - Manual creation of BELUs) | | Back-end LUN Provisioning (Automatic back-end creation of BELUs) | |
| --- | --- | --- | --- | --- |
| | Performance Pool | Capacity Pool | Performance Pool | Capacity Pool |
| Plan LUNs Distribution Check Array Available Check Space Available | 107 s | 169 s | 23 s | 23 s |
| Create Hosts | 317 s | 63 s | 120 s | 180 s |
| Create LUNs | 173 s | 149 s | | |
| Present LUNs to SVSP | 144 s | 48 s | | |
| TOTAL | 741 s | 429 s | 143 s | 203 s |

What is claimed is:

1. A method for allocating storage space, comprising:
determining one or more proposed back end logical units (BELUs) to match selected performance parameters for a storage pool, wherein the selected performance parameters comprise a size of the storage pool and a type of the storage pool;
identifying a current disk group that can support the proposed BELUs;
and, if no current disk group can support the proposed BELUs:
analyzing a plurality of storage arrays to locate free disks that can be formed into a proposed disk group to support the proposed BELUs; and
creating a proposal showing the changes that would be made to a storage system to create the storage pool.

2. The method of claim 1, comprising:
adding the proposed disk group to the proposal; and, if instructed, creating an actual disk group corresponding to the proposed disk group.

3. The method of claim 1, comprising:
adding the proposed BELUs to the proposal; and, if instructed:
creating actual BELUs corresponding to the proposed BELUs;
forming the storage pool comprising the actual BELUs; and
revising a storage map to show an allocation of the actual BELUs.

4. The method of claim 1, comprising:
identifying existing BELUs that can be aggregated to form the storage pool; and
adding the existing BELUs identified to the proposal.

5. The method of claim 4, comprising, if instructed, forming the storage pool comprising the existing BELUs.

6. The method of claim 1, comprising, if the storage pool is a capacity pool:
analyzing the plurality of storage arrays to identify a storage array that has unallocated disk storage that is equal to or greater than a requested size of the capacity pool;
preallocating the proposed disk group within the unallocated disk storage, wherein a size of the disk group is greater than the requested size of the capacity pool; and
creating the proposal comprising the proposed disk group; and, if instructed:
creating an actual disk group from the proposed disk group;
creating an actual BELU within the actual disk group;
creating the capacity pool comprising the actual BELU; and
revising a storage map to show an allocation of the actual BELU.

7. The method of claim 1, comprising, if the storage pool is a performance pool:
calculating a number of storage arrays needed to support a selected number of stripes;
preallocating a plurality of disk groups to support a plurality of BELUs comprising the performance pool, wherein each of the plurality of BELUs corresponds to a stripe; and
adding the plurality of disk groups to the proposal; and, if instructed:
creating a plurality of actual disk groups from the plurality of disk groups;
creating the plurality of BELUs within the plurality of actual disk groups;
forming the performance pool comprising the plurality of BELUs; and
revising a storage map to show an allocation of the plurality of BELUs.

8. The method of claim 1, comprising:
assigning a virtual disk to the storage pool;
mapping a front end logical unit number (LUN) to the virtual disk; and
presenting the front end LUN to a host computer.

9. A storage system, comprising:
a plurality of storage arrays, wherein each of the plurality of storage arrays comprises a plurality of disk drives, and wherein each of the plurality of storage arrays are coupled to a storage area network (SAN);
an interface, wherein the interface comprises a map that correlates a plurality of front end logical unit numbers to associated back end logical units (BELUs) located in the plurality of storage arrays; and
a virtualization management unit (VMU), wherein the VMU is coupled to the SAN, and wherein the VMU comprises a memory containing code configured to direct the VMU to:
obtain performance parameters for a storage pool to be located within the plurality of storage arrays, wherein the performance parameters comprise a size of the storage pool and a type of the storage pool;
determine proposed back end logical units (BELUs) to match the performance parameters;
identify current disk groups that can support the proposed BELUs;
if current disk groups are not sufficient to support the creation of the proposed BELUs:
analyze the plurality of storage arrays to locate free disks that can be formed into proposed disk groups to support the creation of the proposed BELUs; and
create a proposal showing the changes that would be made to a storage system to create the storage pool.

10. The storage system of claim 9, wherein the memory comprises a map of existing BELUs allocated to disk groups within the plurality of storage arrays.

11. The storage system of claim 9, wherein the VMU comprises code configured to:
add the proposed BELUs to the proposal; and, if instructed:
create actual BELUs from the proposed BELUs;
form the storage pool from the actual BELUs; and
revise a storage map to show an allocation of the actual BELUs.

12. The storage system of claim 9, wherein the plurality of disk drives comprise near on-line (NOL) disk drives, on-line (OL) disk drives, or both.

13. The storage system of claim 9, wherein the plurality of storage arrays comprises a plurality of existing BELUs.

14. The storage system of claim 13, wherein the plurality of existing BELUs comprises a plurality of existing storage pools.

15. The storage system of claim 14, wherein the plurality of existing storage pools comprises performance pools formed using OL disk drives.

16. The storage system of claim 14, comprising a plurality of virtual disk drives assigned to the plurality of existing storage pools, wherein:
each virtual disk drive of the plurality of virtual disk drives is assigned one front end logical unit number of the plurality of front end logical unit numbers; and
each front end logical unit number of the plurality of front end logical unit numbers is presented to a host by the interface, to allow the host to access data stored in the associated BELUs through the interface.

17. A non-transitory, computer-readable medium, comprising code configured to direct a processor to:
obtain performance parameters for a storage pool to be located within a plurality of storage arrays, wherein the performance parameters comprise a size of the storage pool and a type of the storage pool;
determine one or more proposed back end logical units (BELUs) to match the performance parameters;
identify existing disk groups that can support the proposed BELUs; if the existing disk groups cannot support the proposed BELUs:
analyze the plurality of storage arrays to locate free disks that can be formed into a proposed disk group to support the proposed BELUs; and
create a proposal showing the changes that would be made to a storage system to create the storage pool.

18. The non-transitory, computer-readable medium of claim 17, comprising code configured to direct the processor to:
add the proposed disk group to the proposal; and, if instructed, create an actual disk group corresponding to the proposed disk group.

19. The non-transitory, computer-readable medium of claim 17, comprising code configured to direct the processor to:
add the proposed BELUs to the proposal; and if instructed:
create actual BELUs from the proposed BELUs;
form the storage pool from the actual BELUs; and
revise a map to show the allocation of the actual BELUs.

20. The non-transitory, computer-readable medium of claim 17, comprising code configured to direct the processor to:
generate a map of front end logical unit numbers (LUNs) to a plurality of BELUs; and
transmit the map to an interface unit.

* * * * *